July 21, 1953　　A. B. CRICHTON, JR., ET AL　　2,646,297
COUPLING
Filed Oct. 11, 1948　　3 Sheets-Sheet 1

INVENTORS,
ANDREW B. CRICHTON, JR. AND
CARL G. WENNERSTROM,
BY
ATTORNEY

July 21, 1953 A. B. CRICHTON, JR., ET AL 2,646,297
COUPLING
Filed Oct. 11, 1948 3 Sheets-Sheet 3
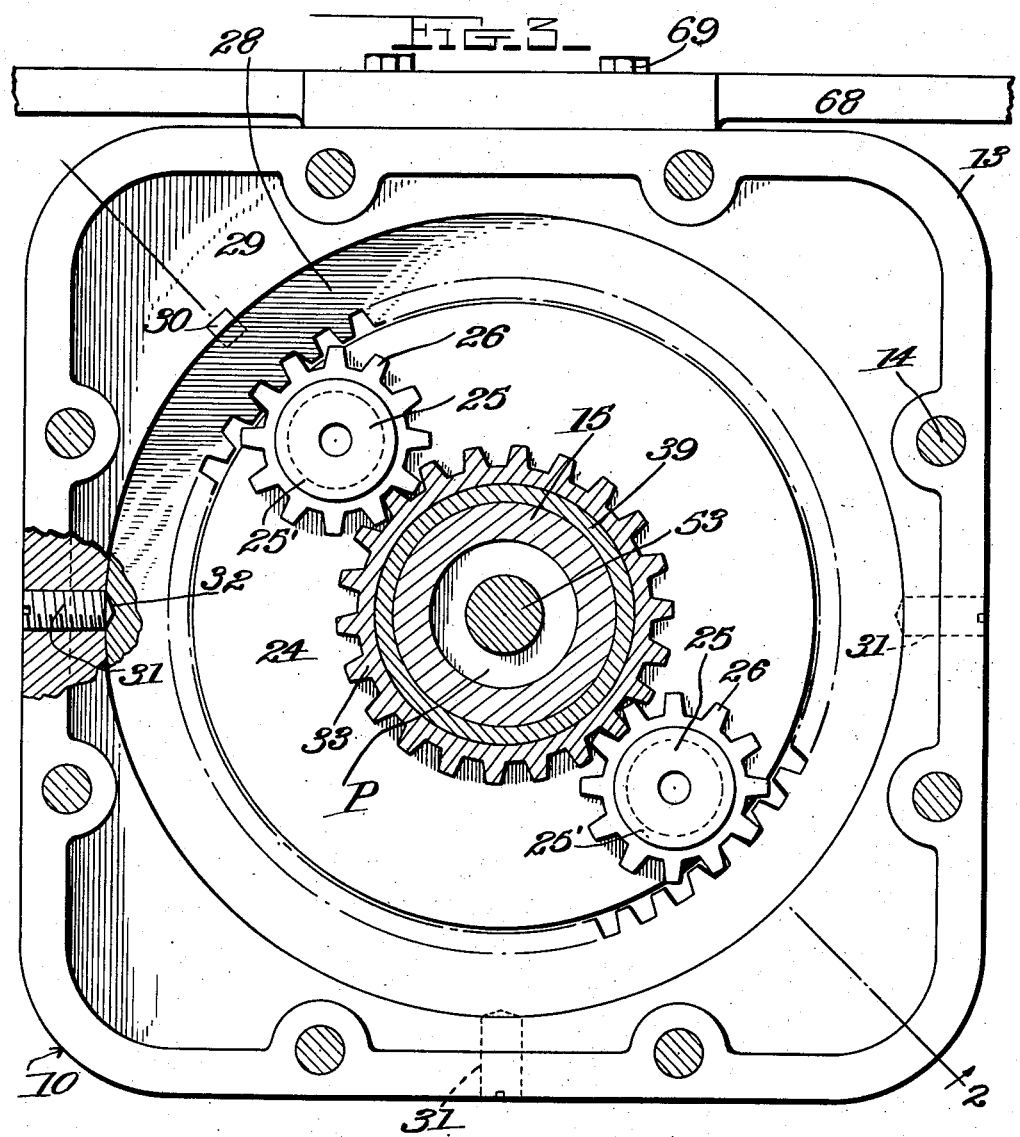
INVENTORS.
ANDREW B. CRICHTON, JR., AND
CARL G. WENNERSTROM,
BY
ATTORNEY.

Patented July 21, 1953

2,646,297

UNITED STATES PATENT OFFICE 2,646,297

COUPLING

Andrew B. Crichton, Jr., Johnstown, Pa., and Carl G. Wennerstrom, Chicago, Ill.; said Wennerstrom assignor to The Crichton Company, Johnstown, Pa., a corporation of Delaware Application October 11, 1948, Serial No. 53,904

4 Claims. (Cl. 287—53)

This invention relates to a coupling, especially adapted but not necessarily limited to interposition removably between a drill head or other device and a short wall coal cutter which drives and supports it, generally like the speed increase takeoff unit or assembly disclosed as part of our pending application for patent, Serial No. 21,893, filed April 19, 1948, entitled Power Takeoff System and Apparatus.

Generally it is aimed to provide such a structure which attains the ends and possesses the advantages set forth in said application, and further to produce a construction which is improved with respect to means for rapid, stable and more efficient separable connection of the assembly and power source; to provide constructions which are generally improved; to provide a construction wherein the casing has parts overlapping bearing devices for the power-receiving shaft and which in turn are overlapped by shoulders on said shaft to guard against axial displacement of the latter; to provide such a shaft with an exterior extension for interfitting engagement with the power takeoff or input shaft; a construction wherein the coupling of the said shafts is effected approximately within the confines of the casing; and to provide a construction having a novel planetary gear transmission.

Various additional objects and advantages will be pointed out hereinafter and otherwise become apparent from a consideration of the accompanying drawings illustrating an operative embodiment. In said drawings:

Figure 3 is a sectional view taken at a right-angle of Figure 2 on the plane of line 3—3 of Figure 2; and Figure 4 is a fragmentary sectional view of a modified form taken on the corresponding plane to Figure 2.

Figure 1:
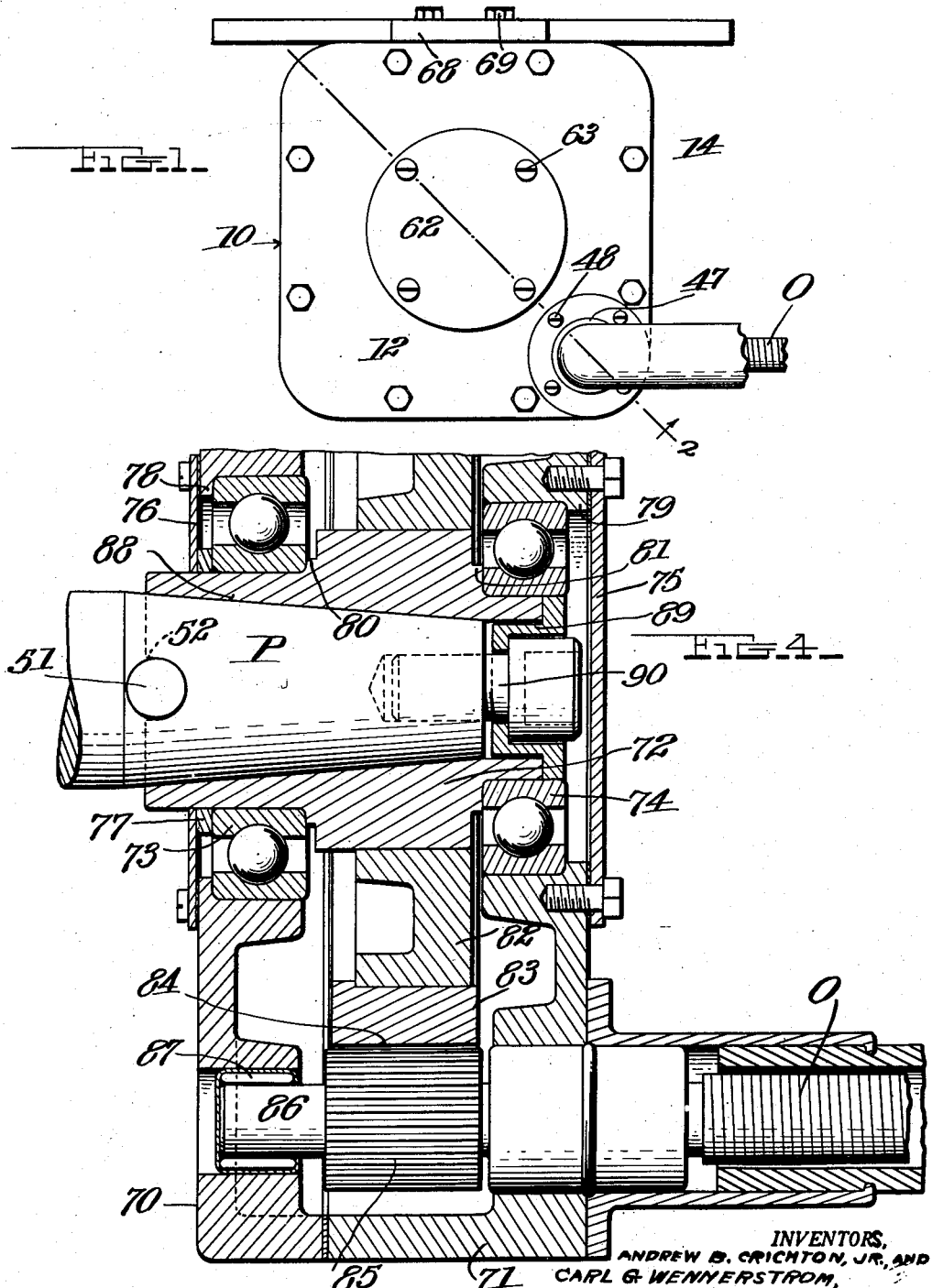
Figure 1 is a front elevation of the speed increase takeoff unit or assembly.
Figure 2:
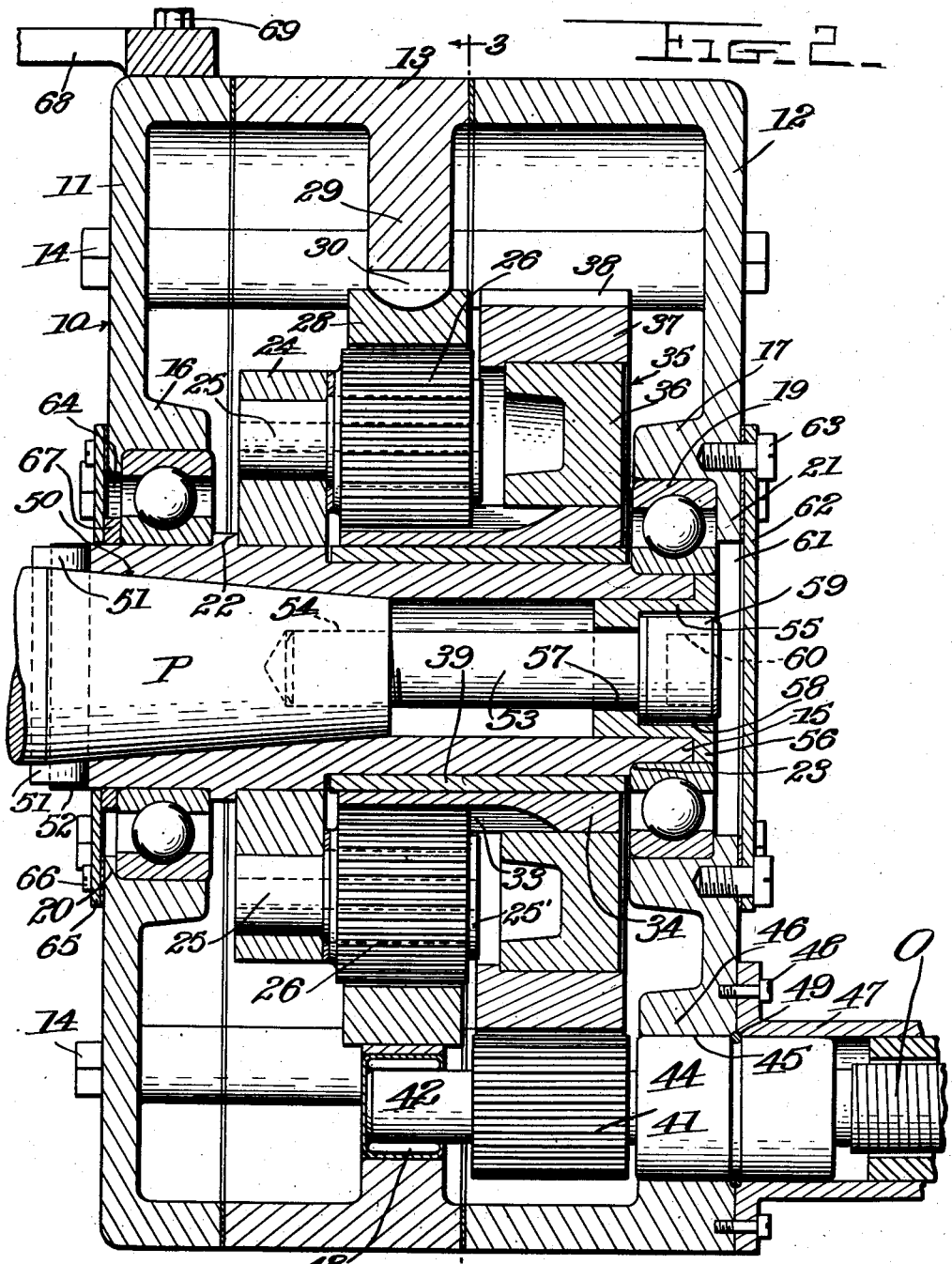
Figure 2 is a sectional view taken diametrically on the plane of line 2 as applied to Figs. 1 and 3.

Referring specifically to the drawings wherein like reference characters designate like or similar parts, and first to the form of Figures 1 to 3, the unit or assembly includes a suitable casing 10, preferably consisting of outer sections 11 and 12 and an intermediate section 13, separably screwed or bolted together at 14. Disposed centrally of said casing is a power-receiving main shaft 15 shown as hollow or tubular, and adapted to be rotated or driven by an input or power take-off shaft P. Through mechanism to be later specifically described, the input power is used to drive or operate a flexible output shaft O.

The casing sections 11 and 12 have aligned, integral inwardly extending annular flange bearings 16 and 17 mounting bearing devices such as ball bearing devices 18 and 19, respectively, held against outward displacement by retaining flanges 20 and 21 of the sections. Said main shaft is journalled in said bearing devices and the latter are retained against inward displacement by abutment against shoulders 22 and 23 on the shaft. As well, this construction effectively mounts the main shaft against axial displacement.

Rigid on main shaft 15 is a plate 24 carrying one or more fixed stub shafts 25 arranged concentrically about shaft 15. Journaled on each stub shaft 25 and retained by a flange 25' thereof is a small planetary gear wheel 26 which is enmeshed with the internal teeth 27 of a gear ring 28 set in an opening of an inwardly extending web 29 integral with casing section 13 and held rigidly in place by a key 30 engaging grooves in the annular walls of both gear ring 28 and web 29, and by pointed binding screws 31 (Fig. 3) threaded in said section 13 and entered in peripheral recesses 32 of said gear ring.

Said planetary gears 26 are enmeshed with the teeth 33 of a sun gear wheel or sleeve 34 which forms the hub of a larger gear wheel 35 completed, for example, by a web ring 36 welded or otherwise fixed peripherally thereof laterally of said teeth 33 and to the periphery of which web ring, a ring 37 having external gear teeth 38 is welded or otherwise fixed.

By means of the hub or gear sleeve 34, large gear-wheel 35 is journalled on shaft 15, preferably directly on a bearing liner sleeve 39. Said teeth 38 are intermeshed with a gear wheel or pinion 41 carried by an auxiliary shaft 42 having a free end journalled in a ball-bearing device 43 mounted in the web 29. Said auxiliary shaft 42 is also journalled in a suitable ball-bearing assembly 44 and is attached to and drives the previously-mentioned flexible output shaft O. In fact, said flexible output shaft 12, pinion 41, auxiliary shaft 42 and bearing assembly 44 are a unit enabling unitary application; shaft 42 and pinion 41 in place thereon passing through an opening 45 in a thickened bearing portion 46 of section 12 occupied by the bearing assembly 44. A cover plate or bracket 47, bolted at 48 to the latter casing section serves to extend the opening 45 or mounting of the bearing assembly 44. A split snap ring 49 carried by assembly 44 assists in anchoring the assembly on the casing.

The instant construction is especially useful though not restricted to such employment, like the take-off assembly or unit disclosed in our pending application Ser. No. 21,893, aforesaid, and thus the shaft 15 is adapted to be driven from a "short wall coal cutter," of which input shaft P may represent a take-off shaft or other driven part thereof. On the other hand, said input shaft P may be a shaft driven from and separately attached to the take-off shaft of the "short wall coal cutter" such as the shaft illustrated at 28 in said application, Ser. No. 21,893.

The separable or detachable coupling of said shafts 15 and P is exceedingly tight and rigid and effected within the first mentioned shaft and approximately within the confines of casing 10. To this end said shafts are tapered along their contacting surfaces at 50 and shaft P has diametrical projections 51 removably interfitted in outwardly open sockets or recesses 52 at one end of shaft 15 exteriorly of the casing, in combination with a draw-bolt 53 threaded into a screw-threaded socket 54 at the other end of the input shaft P.

Associated with draw-bolt 53 is a saddle member 55 removably telescoped into one end of the main shaft 15, and which has an outwardly extending flange 56 in abutment with the wall of shaft 15 at that end. Bolt 53 passes through an opening 57 in the saddle and the latter has an open-ended socket 58 which receives the head 59 of said bolt. Said head 59 preferably has a wrench engaging socket 60 or the equivalent to enable its manipulation. As a result of this construction, the bolt 53 may be rapidly loosened or tightened to remove or secure the input shaft P in place with a wedge fit at 50, and with the projections 51 tightly interengaged in the sockets 52. Thus the input shaft and the bolt 53 are readily detachable from the assembly or unit.

Casing section 12 is centrally open as at 61 to facilitate manipulation of the bolt 53, and such opening is normally closed by a plate 62 screwed in place as at 63. The opposite end of the casing at section 11 is also centrally open at 64 but is normally closed by a plate 65 secured in place at 66, and which plate in turn secures a washer 67 about the shaft 15 and against the ball-bearing device 18.

In order to hold the casing 10 stationary against liability to turn or rotate with the input shaft P and shaft 12, a torque device 68 is bolted or otherwise fastened at 69 to any suitable part of the casing 10 and arranged to overlap the "short wall coal cutter" which drives the input shaft P.

In use, the input shaft P being driven by the "short wall coal cutter" or otherwise, due to its coupling rigidly to shaft 15, will rotate the latter and in turn plate 24 rigid thereon moves pinions 26 in an orbit concentrically of the shaft P, and the pinions or gears 26 are turned through the enmeshing of their teeth with those of the stationary ring gear 28. Such pinions or planetary gears 26 turn the sun gear 33, which is a part of and hence effects rotation of the large gear wheel 35. As one example, in actual practice, the ratio of the described gearing is such that the gear wheel 35 rotates three times as fast as the input shaft P or power take-off shaft of the mentioned "short wall coal cutter." Said large gear wheel 37 rotates gear-wheel 41 and accordingly rotates the flexible shaft O. As one example in practice, with such large gear wheel 37 rotating three times as fast as the input shaft P as previously mentioned, the flexible shaft O had approximately 3600 R. P. M. Such shaft may be used for operating a drill head in coal mining as disclosed in our previously mentioned pending application, but at the same time may equally well be used for general purposes, such as to operate one or more faces or cross-cut conveyors, portable rock dusters, hoists, saws and the like.

While the present unit or assembly may be left permanently attached to the "short wall coal cutter" or equivalent, such unit or assembly is well adapted for quick release and replacement where the input shaft P is either the power take-off of such machine or is permanently attached thereto, since the unit may be removed and replaced, by first removing the plate 62, then bolt 53, and sliding the unit off of the input shaft P.

A modified form of the invention is shown in Fig. 4, which essentially consists of a unit such as that previously described, without the planetary gear transmission and with the casing of less parts. This modified form of the invention is adapted for use with a different type of "short wall coal cutter" than the preceding form of the invention, and particularly where the gear ratio is approximately 7.5:1 as compared with a gear ratio of approximately 7.5:1 or 13.5:1 in the case of the first described form of the invention. In this modified form of Figure 4, the casing consists of separable sections 70 and 71 which mount a main or power receiving shaft 72 in ball-bearings or the equivalent 73 and 74 like the mounting of the shaft 15 in the preceding form. The associated parts such as plates 75 and 76, and washer 77, conform to the similar parts used in the preceding form at 62, 65 and 67, respectively. The flanges 78 and 79 as well as shoulders 80 and 81 correspond with the parts 20, 21, 22 and 23 of the first form. Shaft 72 constitutes the hub of a large gear wheel in the present instance in that a web ring 82 is welded or otherwise rigidly fastened peripherally thereto and a gear ring 83 is welded or otherwise fastened to the periphery of such ring. Ring 83 has external gear teeth 84 enmeshed with a gear-wheel 85 corresponding to that employed at 41 in the preceding form and which operates a power output shaft O identical with that similarly identified in the preceding form. Such pinion 85 is carried by a shaft 86 removably journalled in a bearing device 87 like that at 43, but in this instance carried by casing section 70. The entire flexible shaft assembly O, gear 85, shaft 86, and associated ball-bearing mounting and parts attaching the same to the casing section 71 are interiorly removable and replaceable like the corresponding parts in the preceding form. Also the input shaft P is identical with that employed in the preceding form and has a wedge fit at 88, corresponding to that at 50 in the preceding form and being detachably and removably secured in place through the use of a saddle 89 and bolt 90, constructed and correspondingly functioning like the parts 55 and 53 of the preceding form.

Various changes may be resorted to, provided they fall within the spirit and scope of the invention as defined by the appended claims.

What is claimed is:

1. A device of the class described comprising an input shaft, a hollow power receiving shaft for coupling engagement with said input shaft insertable from one end of the hollow shaft into the hollow thereof, a saddle fitted in one end of the hollow shaft having a portion extending into said hollow and a portion abutting against the adjacent end wall of said hollow shaft, and a draw device mounted by said saddle for co-action with the input shaft.

2. A device of the class described comprising an input shaft, a hollow power receiving shaft for coupling engagement with said input shaft insertable from one end of the hollow shaft into the hollow thereof, a saddle fitted in one end of the hollow shaft having a portion extending into said hollow and a portion abutting against the adjacent end wall of said hollow shaft, a screw device anchored by said saddle and attachable to the input shaft, said screw device having a head, and said saddle having a socket to accommodate said head.

3. A device of the class described comprising an input shaft, a hollow power receiving shaft for coupling engagement with said input shaft insertable from one end of the hollow shaft into the hollow thereof, the wall of said shaft within the hollow at said end being tapered to fit the input shaft, said hollow shaft at the latter end having means for interfitting engagement with the input shaft, and draw means in said hollow operable at the other end of the hollow shaft for coacting engagement with the input shaft.

4. A device of the class described comprising an input shaft, a hollow power receiving shaft for coupling engagement with said input shaft insertable from one end of the hollow shaft into the hollow thereof, the wall of said shaft within the hollow at said end being tapered to fit the input shaft, said hollow shaft at the latter end having means for interfitting engagement with the input shaft, draw means in said hollow operable at the other end of the hollow shaft for coacting engagement with the input shaft, said draw means comprising a screw having a head, a saddle through which said screw passes and which is abutted by said head, and said saddle having a flange abutting the adjacent end of the hollow shaft.

ANDREW B. CRICHTON, Jr.
CARL G. WENNERSTROM.

References Cited in the file of this patent

UNITED STATES PATENTS

| Number | Name | Date |
|---|---|---|
| 605,472 | Brown | June 14, 1898 |
| 1,004,203 | Ross | Sept. 26, 1911 |
| 1,155,538 | Worrest | Oct. 5, 1915 |
| 1,546,967 | Buehler | July 21, 1925 |
| 1,903,060 | Mitchell | Mar. 28, 1933 |
| 2,147,285 | Double et al. | Feb. 14, 1939 |
| 2,286,236 | Scott | June 16, 1942 |
| 2,364,599 | Burrus | Dec. 12, 1944 |
| 2,413,763 | Heyer | Jan. 7, 1947 |
| 2,441,446 | Schmitter | May 11, 1948 |
| 2,475,042 | McCloskey | July 5, 1949 |
| 2,477,024 | Webster | July 26, 1949 |